United States Patent [19]

Le Derf

[11] Patent Number: 5,897,093
[45] Date of Patent: Apr. 27, 1999

[54] ANTIVIBRATION/ANTISHOCK DEVICE USING CABLE SEGMENTS AND STABILIZER BLADES

[75] Inventor: Eric Le Derf, Suresnes, France

[73] Assignee: Socitec-Société pour le Commerce International et les Echanges Techniques, Sartrouville, France

[21] Appl. No.: 08/714,900

[22] Filed: Sep. 17, 1996

[30] Foreign Application Priority Data

Sep. 20, 1995 [FR] France .................................. 95 11056

[51] Int. Cl.⁶ .................................................. F16M 13/00
[52] U.S. Cl. ........................................... 248/628; 248/570
[58] Field of Search .................................... 248/628, 636, 248/570, 638, 603, 618, 562; 267/33, 152, 153, 148

[56] References Cited

U.S. PATENT DOCUMENTS

| | | | |
|---|---|---|---|
| 3,074,681 | 1/1963 | Kerley, Jr. ................... | 248/570 |
| 4,190,227 | 2/1980 | Belfield et al. ............... | 248/636 |
| 4,586,689 | 5/1986 | Lantero ....................... | 248/570 |
| 4,783,038 | 11/1988 | Gilbert et al. ................ | 248/570 |
| 4,854,556 | 8/1989 | Pietrzak ....................... | 267/33 |
| 4,942,075 | 7/1990 | Hartel et al. ................. | 248/634 |
| 5,062,507 | 11/1991 | Roche ......................... | 188/378 |
| 5,149,066 | 9/1992 | Snaith et al. ................. | 267/136 |
| 5,169,110 | 12/1992 | Snaith et al. ................. | 267/148 |
| 5,358,210 | 10/1994 | Simon et al. ................. | 248/628 |
| 5,499,790 | 3/1996 | Hay ............................ | 248/570 |

FOREIGN PATENT DOCUMENTS

| | | |
|---|---|---|
| 0263970A1 | 4/1988 | European Pat. Off. . |
| 2359324 | 2/1978 | France . |
| 0358146A1 | 4/1990 | France . |
| 2695696 | 3/1994 | France . |
| 0612932A1 | 8/1994 | France . |
| 1750751 | 3/1971 | Germany . |

OTHER PUBLICATIONS

Patent Abstracts of Japan, vol. 012, No. 109 (M–682), Apr. 8, 1988 & JP–A–62 237135, Mitsubishi Electric Corp., Oct. 17, 1987.

*Primary Examiner*—Leslie A. Braun
*Assistant Examiner*—Anita M. King
*Attorney, Agent, or Firm*—Evenson, McKeown, Edwards & Lenahan P. L. L. C.

[57] ABSTRACT

An antivibration/antishock device includes a support member and a supported member disposed face to face and joined by a plurality of cable segments disposed on opposite sides of the support and supported members. Each of the cable segments is fixed to the support member and to the supported member and extends between the support and supported members in an at least partly curved cable path. The support and supported members are also joined by at least two stabilizer blades also fixed at their ends on opposite sides of the support and supported members. The stabilizer blades have a profile substantially corresponding to that of the cable path of the cable segment.

9 Claims, 6 Drawing Sheets

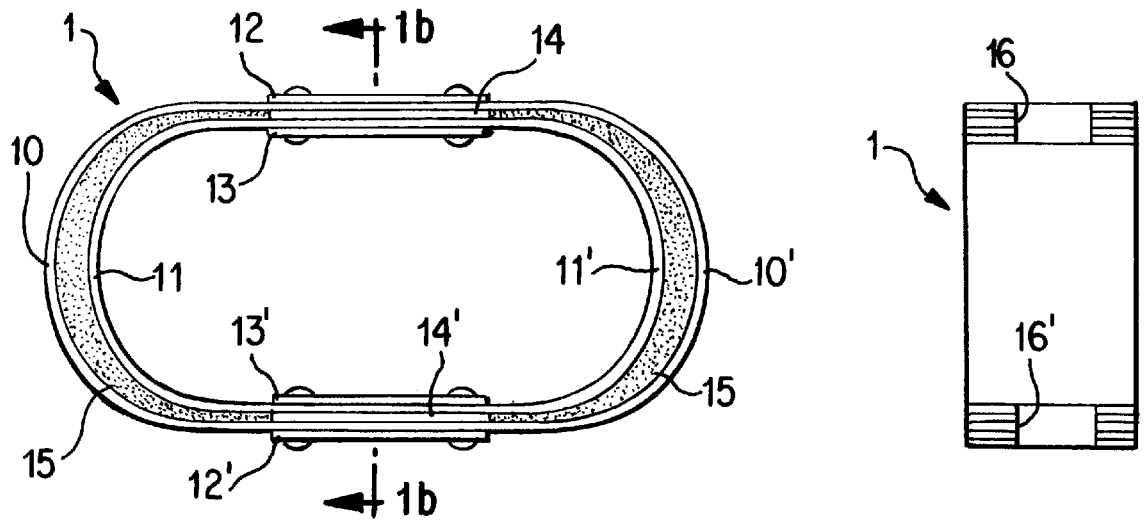
FIG. 1a PRIOR ART
FIG. 1b PRIOR ART
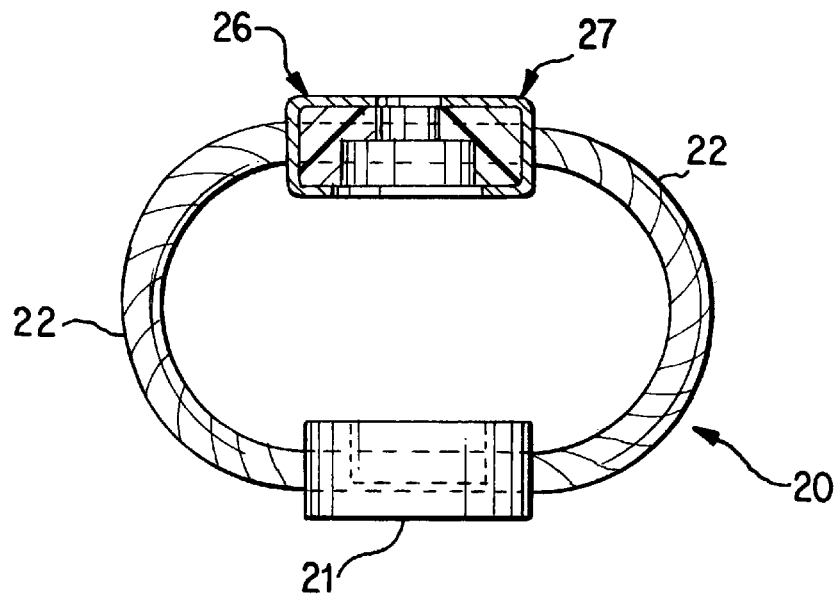
FIG. 2a PRIOR ART

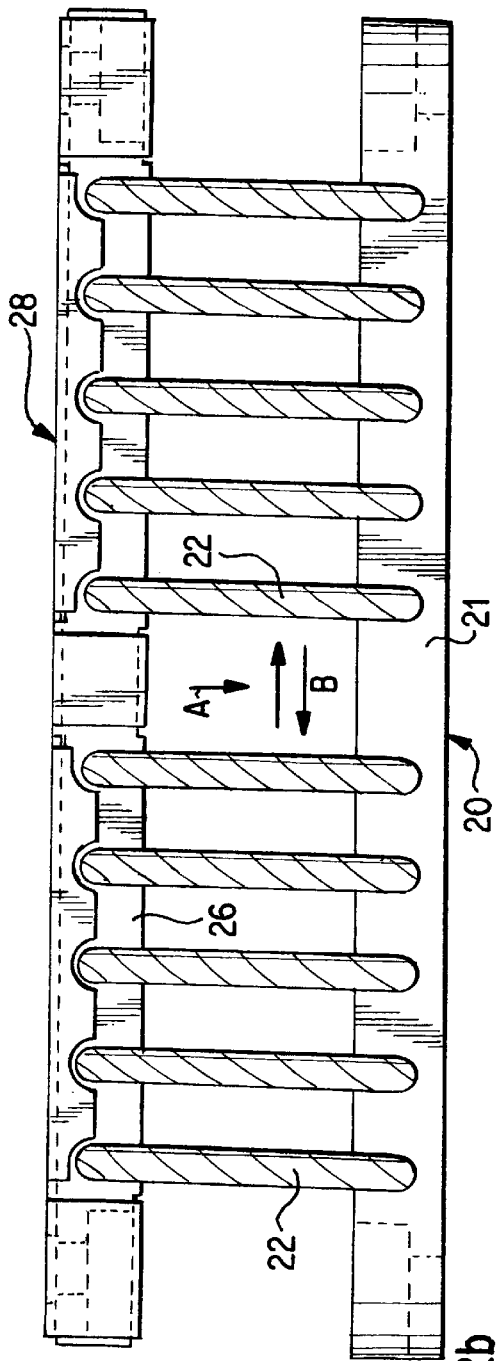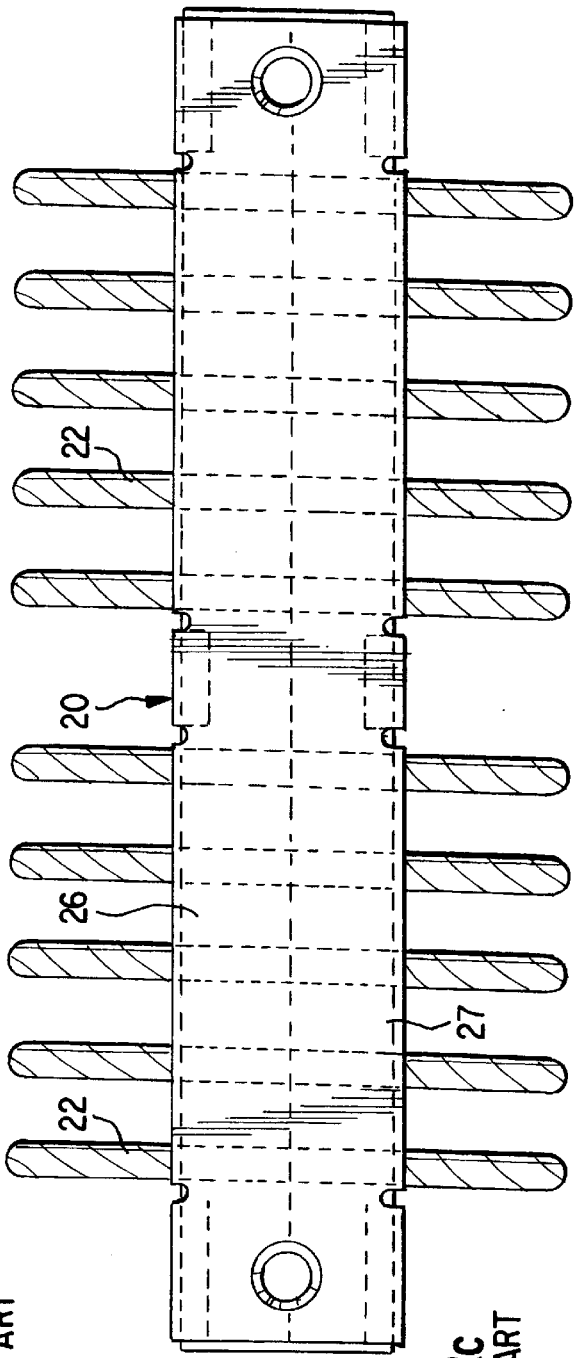
FIG.2b PRIOR ART
FIG.2c PRIOR ART

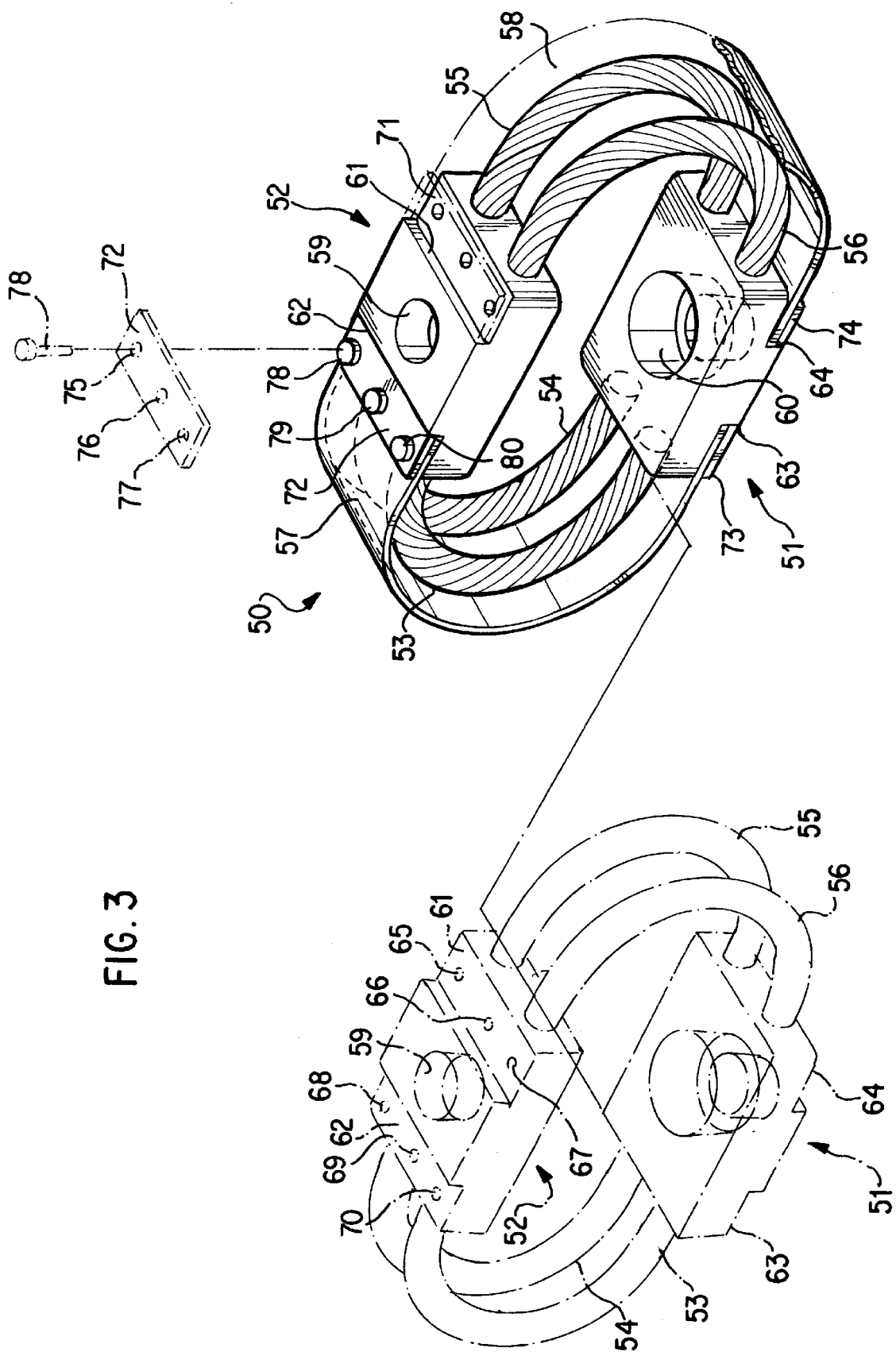

ANTIVIBRATION/ANTISHOCK DEVICE USING CABLE SEGMENTS AND STABILIZER BLADES

BACKGROUND OF THE INVENTION

1. Field of the Invention

The present invention concerns antivibration/antishock devices. To be more precise, it concerns devices of the kind including a support member and a supported member joined together by damping means.

Damper devices of this kind are used to mount electric motors and internal combustion engines, air compressors and the like, and also to protect fragile or sensitive equipment against shock and vibration.

2. Description of the Prior Art

A prior art damper of this type is shown in figures 1a and 1b which are respectively an elevation view and a view in cross-section on the line X—X in figure 1a. It comprises a set of four substantially U-shape stainless steel blades received one within the other in pairs, the inside and outside blades of each pair of blades 10, 10', 11, 11' being respectively riveted to the corresponding blades of the other pair at their ends, to form a damper device 1 of approximately elliptical shape. In this example the fixing also uses respective attachment plates 12, 13 and 12', 13' covering the planes in which the blades are joined together and respective spacer plates 14 and 14' between the respective outside blades 10, 10' and inside blades 11, 11'.

The spaces between the respective outside blades 10, 10' and inside blades 11, 11' are filled with a damper substance 15 based on epoxy resin.

Bores 16 and 16' in the respective blades and plates are used to fix the object to be supported and to fix the damper device 1 to a base.

We have found that a damper device of this kind has a number of disadvantages.

First of all, epoxy resin has very poor heat resistance: around 0° C. it is practically rigid, while at around 30° C. it has a somewhat soft consistency.

As a result the resonant frequency of the damper device is highly temperature dependent, which is unthinkable for a device of this kind, since the aim is for it to have a given resonant frequency for a given supported mass.

Further, substances based on epoxy resins age badly and their service life is relatively limited. It is therefore necessary to replace damper devices incorporating such substances relatively frequently.

Moreover, a device of this kind is relatively complex to manufacture and consequently relatively costly.

We have considered replacing this type of damper device by another prior art type shown in FIGS. 2a through 2c which are respectively part-sectional, elevation and plan views of that device. The device 20 includes a bar 21 into a middle portion of which several runs of cable 22 are anchored, while the free ends of the cable 22 are each anchored in one of the elongate members 26 and 27. The elongate members 26 and 27 are held side by side in a plane parallel to the bar 21 by retaining means 28, the runs of cable 22 defining parallel curved cable segments 22 on opposite sides of the bar 21 and of the members 26 and 27.

Unfortunately, this type of damper device also has certain limitations.

If a compression load is applied to this damper device, it proves to be unstable in the horizontal direction: rather than moving only in a vertical direction (direction of the arrow A) it also moves horizontally (direction of the arrow B).

The present invention is aimed at alleviating these disadvantages.

SUMMARY OF THE INVENTION

To this end it proposes an antivibration/antishock device of the kind including a support member and a supported member disposed face to face and joined by a plurality of cable segments disposed on opposite sides of the support and supported members, each of said cable segments being fixed to the support member and to the supported member and extending between said support and supported members in an at least partly curved cable path, wherein said support and supported members are also joined by at least two stabilizer blades also fixed at their ends to said support and supported members, on opposite sides of said support and supported members, said stabilizer blades having a profile substantially corresponding to that of the cable path of said cable segments.

By virtue of these features, the present invention alleviates the drawbacks mentioned above.

The combination of the blades and the cable segments stabilizes the damper device in the horizontal plane, the device otherwise having damping characteristics identical to those of the prior art.

Further, the stabilizing blades have a certain stiffness which means that the diameter of the cable segments can be smaller than that of the prior art cable segments, facilitating assembly of the damper device, whilst retaining the same dimensions as the prior art damper devices.

At least one of the support and supported members is advantageously a modular member including individual cable segment anchor modules and means for assembling the latter together.

These features facilitate the fabrication of the device. The cable segments can be anchored to the support and supported members flat, before the individual anchor modules are anchored together using the assembly means.

Further, in the demounted state the device occupies a small space, facilitating transport and storage.

To facilitate assembly further, said assembly means also constitute means for fixing the blades to the support and supported members.

The features and advantages of the present invention will emerge from the following description given with reference to the accompanying drawings.

BRIEF DESCRIPTION OF THE DRAWINGS

FIG. 1a, as noted previously, is an elevation view of a known damper.

FIG. 1b, as noted previously, is a cross-sectional view along line X—X in FIG. 1a.

FIG. 2a, as noted previously, is a part-sectional view of another known damper.

FIG. 2b, as noted previously, is a elevation view of the damper shown in FIG. 2a.

FIG. 2c, as noted previously, is a plan view of the damper shown in FIG. 2a.

FIG. 3 is a perspective view of a first embodiment of a device of the invention.

DETAILED DESCRIPTION OF THE PREFERRED EMBODIMENTS

Figure 4:
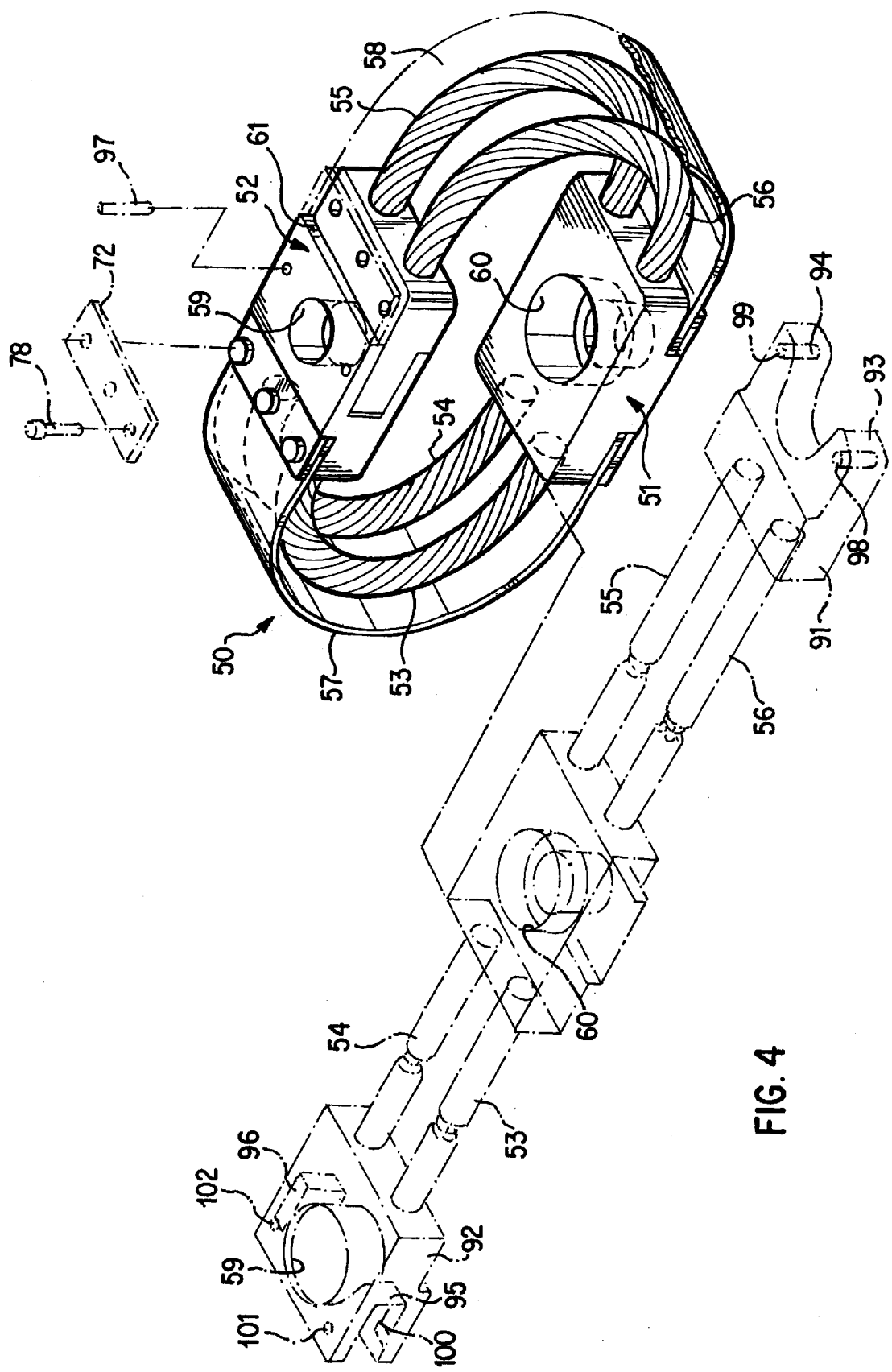
FIG. 4 is a perspective view of a second embodiment of a device of the invention.

Before describing a first embodiment of an antivibration/antishock device of the invention with reference to FIG. 3, it is as well to note that, in FIGS. 3 through 6, some parts of the device of the invention have been shown in chain-dotted outline in order to show the unassembled condition of the corresponding device.

Note also that identical or similar items in FIGS. 3 through 6 are always identified by the same reference number.

In a first embodiment shown in FIG. 3, an antivibration/antishock device 50 includes a support member 51 and a supported member 52 joined together by four cable segments 53, 54, 55, 56 and two U-shape stabilizer blades 57, 58, forming damping means.

The device is in this example intended to support a mechanism generating vibration, the mechanism being fixed to the supported member 52 by a screw (not shown) passing through the bore 59 in the supported member 52. Another bore 60 in the support member 51 is used to fix the device 50 to a supporting base.

The support member 51 and the supported member 52 are substantially rectangular parallelepiped shape blocks cast from a light alloy such as aluminum alloy. The ends of the individual cable segments 53, 54, 55, 56 are anchored in the support member 51 and the supported member 52 when they are cast. One end of each segment is anchored in the support member 51 and the other is anchored in the supported member 52 so that two parallel substantially U-shape cable segments are disposed on opposite sides of the support member 51 and supported member 52. The cable segments 53, 54, 55, 56 are symmetrical with respect to a transverse median plane of the device 50.

The stabilizer blades 57, 58 are made of stainless steel and have a U-shape profile that fits around and is spaced from the U-shape path of the corresponding cable segments 53, 54, 55, 56.

The blades 57, 58 are screwed to the support member 51 and supported member 52. The supported member 52 has two lateral recesses 61, 62 on the side facing outwards, on opposite sides of the bore 59, each of these recesses 61, 62 including three screwthreaded holes 65, 66, 67 and 68, 69, 70, respectively. The support member 51 also has lateral recesses 63, 64 and screwthreaded holes similar to those in the supported member 52. Each end of the U-shape profile of each blade 57, 58 is immobilized in a respective lateral recess 61, 62, 63, 64 and incorporates three holes respectively communicating with the corresponding screwthreaded holes in the lateral recesses 61, 62, 63, 64. Plates 71, 72, 73, 74 are placed over the ends of the blades 57, 58 fixed in the lateral recesses 61, 62, 63, 64 so that their outwardly facing side is flush with the outwardly facing surface of the support member 51 or supported member 52. Holes 75, 76, 77 through these plates communicate with the corresponding holes and screwthreaded holes in the blades and in the support and supported members. Screws, of which only three screws 78, 79, 80 are shown in FIG. 3, are screwed into the screwthreaded holes in the various lateral recesses 61, 62, 63, 64 through the corresponding holes in the ends of the blades 57, 58 and the plates 71, 72, 73, 74 to fix the blades 57, 58 to the support member 51 and supported member 52.

When fixed, the blades 57, 58 are disposed face to face on opposite sides of the support member 51 and supported member 52 to define an antivibration/antishock device 50 that is approximately elliptical in shape.

FIG. 4 shows a preferred embodiment of the antivibration/antishock device 50. The latter is identical in all respects to the antivibration/antishock device 50 from FIG. 3 except that here the supported member 52 is a modular member. Accordingly, only the features relating to the modular member 52 are described here.

The modular member 52 includes two individual anchor modules 91, 92 for anchoring the ends of the cable segments 53, 54, 55, 56. The modules 91, 92 are castings.

To be more precise, one of the anchor modules 91, 92 is a male member 91 designed to plug into the other anchor module 92 constituting a female member. To this end the male member 91 has two fingers 93, 94 which in the assembled state of the modular member 52 engage in two complementary openings 95, 96 in the female member 92.

The modular member further includes means for assembling the individual anchor modules 91, 92 together. These assembly means comprise two pins 97, only one of which is shown in FIG. 4. The pins 97 are force fitted in bores 98, 99 in the fingers 93, 94 of the male member 91; in the assembled state of the male and female members 91 and 92, the bores 98, 99 communicate at both ends with receiving holes on either side of the openings 95, 96 in the female member 92; only three receiving holes 100, 101, 102 can be seen in FIG. 4.

Note that the fingers 93 and 94 are shaped so that, in the assembled state of the male and female members 91 and 92, they surround the bore 59 described in detail with reference to FIG. 3 and that in this embodiment the lateral recess 71 is formed, in the assembled state of the male and female members 91 and 92, by an outwardly facing part of the female member 92 overlapping the top of the male member 91.

Because of these features, casting of the support member 51 and supported member 52 and the anchoring of the ends of the cable segments 53, 54, 55, 56 to these members can be carried out flat, before the modular member is assembled, after which the U-shape stabilizing blades 57, 58 are fixed on. This antivibration/antishock device 50 is therefore slightly easier to manufacture than the first embodiment described with reference to FIG. 3, in which it is necessary to dispose spacers between the molds for casting the support member 51 and supported member 52.

The characteristics of the antivibration/antishock device described with reference to FIG. 4 are as follows:

13 mm diameter multistrand cable, length of support and supported member 51 and 52: 70 mm, width of support and supported member 51 and 52: 51 mm, height of support and supported member 51 and 52: 18 mm, height of device measured at middle fiber: 92 mm, width of device measured at middle fiber: 189 mm, total height of device: 113.2 mm, 1.6 mm thick steel blade having an inside radius of curvature of 55 mm, static load $C_s$: 70 daN, vertical resonant frequency $F_v$: 8 Hz, vertical stiffness $K_v$: 180 000 N/m, row stiffness $K_r$: 80 000 N/m,
shear stiffness $K_c$: 160 000 N/m.

Figure 5:
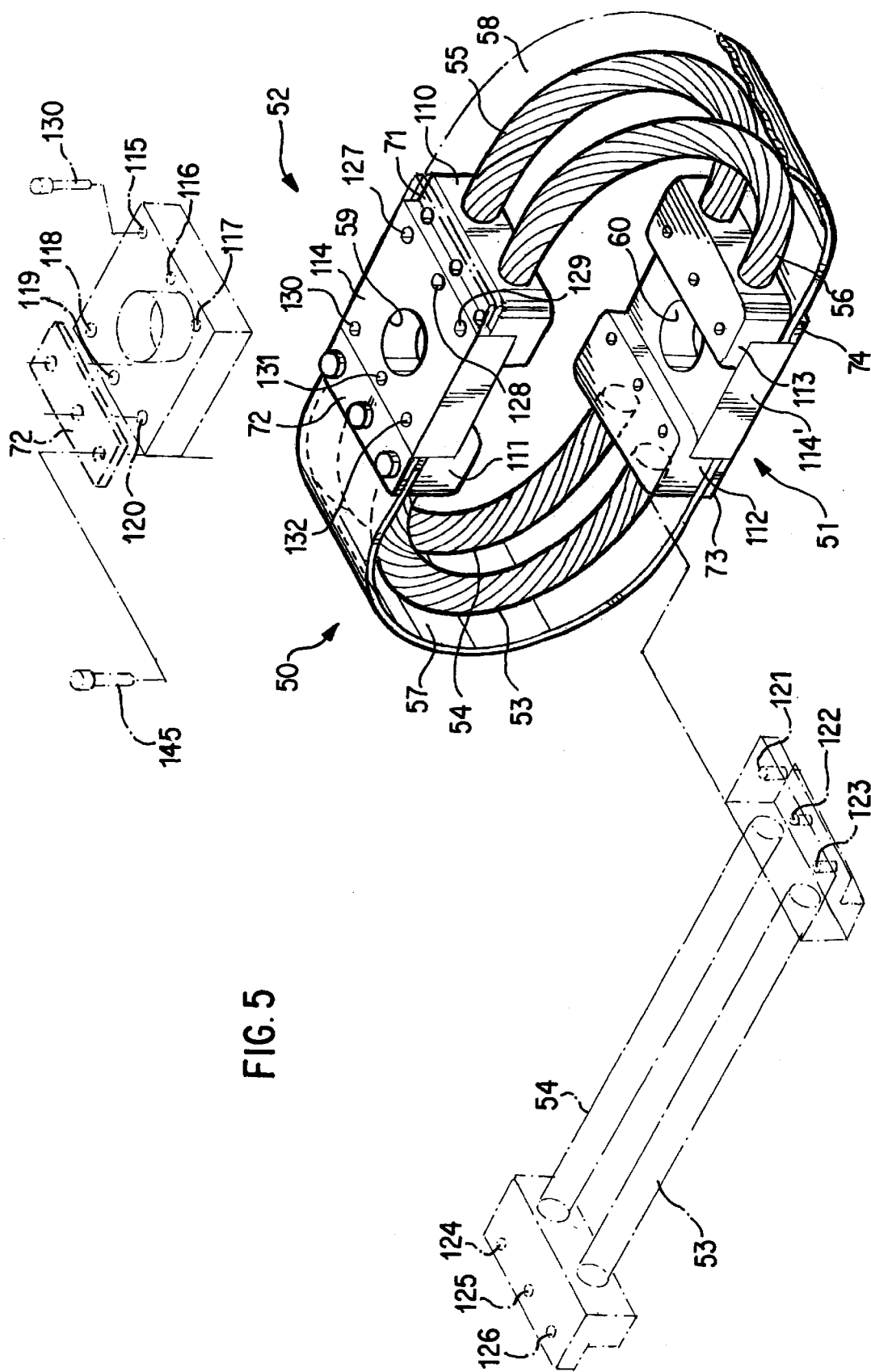
FIG. 5 is a perspective view of a third embodiment of a device of the invention.

In the FIG. 5 embodiment the support and supported members 51 and 52 are both modular members.

The modular members 51, 52 include individual anchor modules 110, 111, 112, 113 with an L-shape cross-section. The modular members 51, 52 further include means for assembling together the individual anchor modules 110, 111, 112, 113, in the form of attachment plates 114, 114' in which the bores 59 and 60 are formed, together with three screwholes on each side of the bores 59 and 60. These screwholes 115, 116, 117, 118, 119 and 120, in the case of the plate 114, each communicate with a screwthreaded hole in one of the branches of the L-shape of a corresponding anchor module 110, 111, 112, 113 when, in the assembled state of the modular supported or support member 52 or 51 the attachment plate 114, 115 is disposed with its screwholes 115, 116, 117, 118, 119, 120 in the corners of the branches of the respective L-shapes. The screwthreaded holes 121, 122, 123, 124, 125 and 126 that can be seen in FIG. 5 are in the anchor modules 111 and 112. Screws 127, 128, 129, 130, 131, 132 passing through the screwholes 115, 116, 117, 118, 119, 120 are screwed into the screwthreaded holes 121, 122, 123, 124, 125, 126 to assemble the individual anchor modules 110 and 111 together and likewise the anchor modules 112 and 113.

In a similar way to the previous embodiment, the stabilizer blades 57, 58 are screwed to the second branches of the L-shapes formed by the individual anchor modules 110, 111, 112, 113: one screw 145 is shown in FIG. 5. Plates 71, 72, 73, 74 are also used in this embodiment, the lateral recesses being obtained by virtue of the thickness of the attachment plates 114, 114'.

By virtue of these features, and those shown in chain-dotted line in FIG. 5, it is possible to make a plurality of individual anchor module subunits to which cable segments are anchored.

In this embodiment the individual anchor means 110, 111, 112, 113 and the attachment plates 114, 114' are castings.

Figure 6:
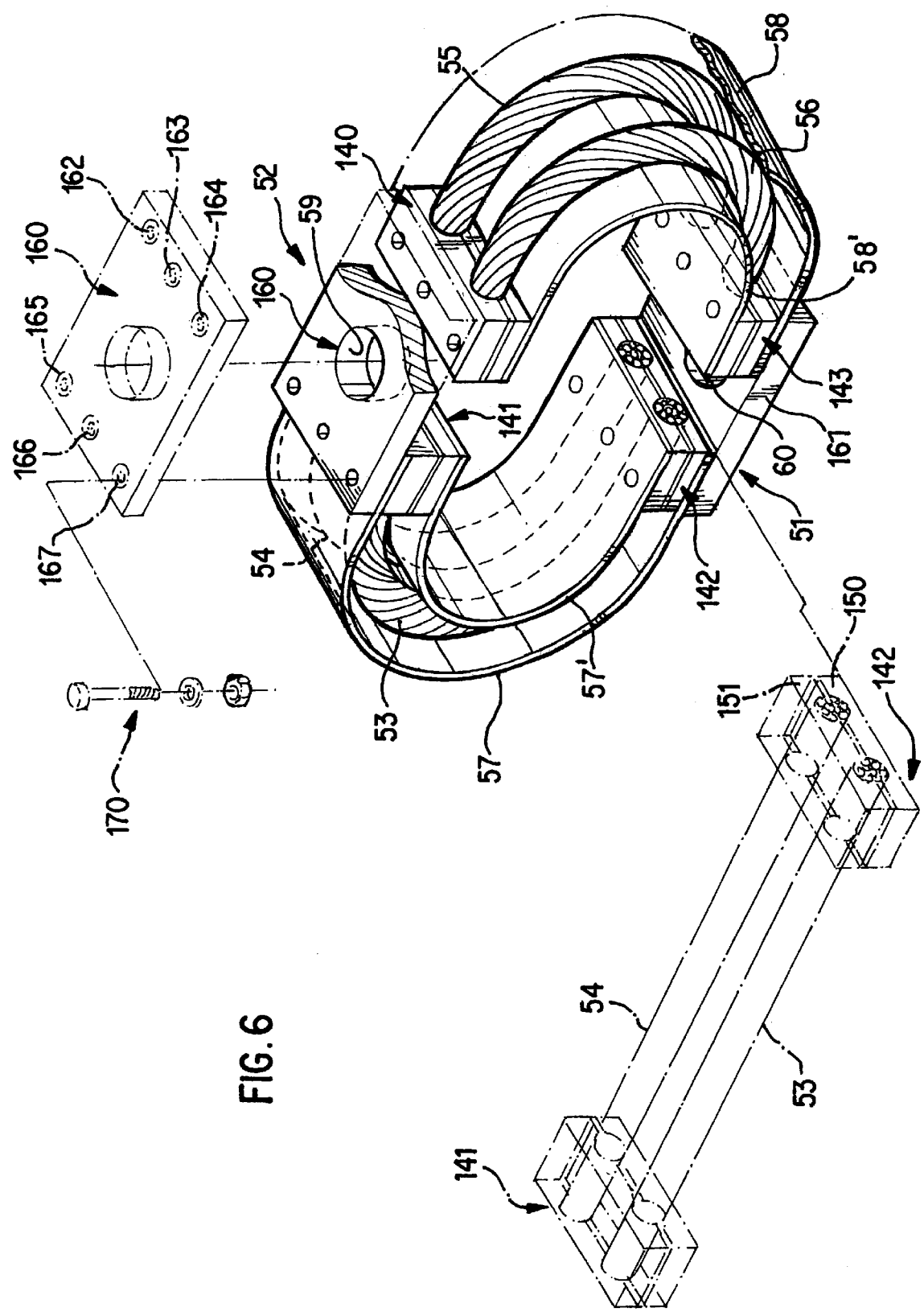
FIG. 6 is a perspective view of a fourth embodiment of a device of the invention.

In the FIG. 6 embodiment the support and supported members 51 and 52 are again modular but are not castings.

Respective pairs of stabilizer blades 57, 57' and 58, 58' are provided on opposite sides of the support and supported members 51 and 52, received one within the other and fitting around the corresponding cable segments 53, 54, 55, 56. As in the previous embodiments, the cable path of these segments is at least partially curved, U-shaped in this example.

Each of the anchor modules 140, 141, 142, 143 is made up of two strips, the strips 150, 151 of the module 142 being shown in FIG. 6, with the ends of the corresponding cable segments 53, 54, 55, 56 clamped between them. To this end each of the strips 150, 151 is provided with substantially semicircular grooves to receive the ends of the corresponding cable segments 53, 54, 55, 56. The strips of the other anchor modules 140, 141 and 143 are naturally identical to the strips 150 and 151.

One strip is fixed to the other and the anchor modules 140, 141, 142, 143 are fixed to each other by attachment plates 160, 161 provided with three bolt holes on opposite sides of the bores 59 and 60; the bolt holes 162, 163, 164 and 165, 166, 167 of the plate 160 and a bolt 170 are shown in FIG. 6.

The bolts pass also through holes and bores (not identified by a reference number in FIG. 6) in the stabilizer blades 57, 57', 58, 58' and in the strips 150, 151, so that they not only assemble together the strips and the individual anchor modules 140, 141, 142, 143, but also fix the stabilizer blades 57, 57', 58, 58' to the modular support and supported members 51 and 52. The inside stabilizer blades 57', 58' are fixed to the inside surface of the corresponding strips of the anchor modules 140, 141, 142, 143 and the outside stabilizer blades 57, 58 are inserted between the anchor modules 140, 141, 142, 143 and the attachment plates 160, 161.

All of the antivibration/antishock devices just described alleviate the disadvantages of the prior art mentioned above and also have the advantages mentioned above, in particular damping shock and vibration perfectly whilst remaining stable. Further, with the devices of the present invention, shock and vibration are damped over a shorter vertical distance than in the prior art damper devices like those described with reference to FIGS. 2a and 2b.

The present invention is naturally not limited to the selected embodiments shown. It encompasses any variant within the expertise of the person skilled in the art.

In particular, the latter is free to provide more than two parallel cable segments on each side of the support and supported members 51 and 52, or a single cable segment on each side.

The person skilled in the art will also know how to employ any other process of molding the support and supporting members, for example molding them from plastics material.

Further, the person skilled in the art may dispose a plurality of stabilizer blades such as the blades 57, 58 and 57', 58' in FIGS. 3 through 6 side by side or even in a stack arrangement.

The ends of the cable segments 53, 54, 55, 56 could also be fixed to the support and supported members 51 and 52 in other ways known to the person skilled in the art, such as crimping, adhesive bonding, etc.

In the case of the FIG. 3 embodiment, instead of using cable segments made up of individual runs of cable on either side of the support and supported members 51 and 52, the person skilled in the art will know how to use pairs of cable segments which are part of the same run of cable, one portion of the cable run being anchored in the non-modular support member 51 and the free ends of this run of cable being anchored in respective individual anchor modules of the modular supported member 52.

The steel stabilizer blades could be replaced by composite material stabilizer blades.

Finally, instead of being on the outside of the cable segments as in the embodiments described with reference to FIGS. 3 through 5, the stabilizer blades 57, 58 could be inside the cable segments, in a similar arrangement to the disposition of the stabilizer blades 57', 58' of the embodiment described with reference to FIG. 6.

There is claimed:

1. An Antivibration/antishock device comprising:
   a support member and a supported member disposed face to face,
   a plurality of cable segments joining said support member and said supported member disposed on opposite sides of the support and supported members, each of said cable segments being fixed to the support member and to the supported member and extending between said support and supported members in an at least partly curved cable path,
   at least two stabilizer blades forming damping elements which damp forces in a vertical direction and provide stabilization in a horizontal direction and also joining said support member and said supported member and fixed at their ends to said support and supported members, on opposite sides of said support and supported members, said stabilizer blades facing said cable segments and having profiles substantially corresponding to those of the cable paths of said cable segments.

2. The device claimed in claim 1 wherein at least one of the support and supported members is a modular member including individual cable segment anchor modules and means for assembling them together.

3. The device claimed in claim 2 wherein said assembly means also constitute means for fixing said blades to said support and supported members.

4. The device claimed in claim 1 wherein said blades and said cable paths are substantially U-shaped.

5. The device claimed in claim 1 wherein there are two parallel cable segments on each side of said support and supported members.

6. The device claimed in claim 2 wherein the cable segments on opposite sides of said support and supported members belong, two by two, to the same run of cable, the free ends of said cable run being anchored to said individual anchor modules.

7. The device claimed in claim 1 wherein said cable segments are individual runs of cable.

8. A device as claimed in claim 1 further including a pair of U-shape stabilizer blades on each side of the support and supported members, the two blades being respectively received one within the other, and surrounding the corresponding cable segments which also have a U-shape cable path.

9. The device claimed in claim 1 wherein said support and supported members are cast or molded and said cable segments are anchored in them.

* * * * *